Oct. 8, 1957  J. PAGEL  2,808,869
TRACTION CLEAT
Filed March 16, 1955  2 Sheets-Sheet 1
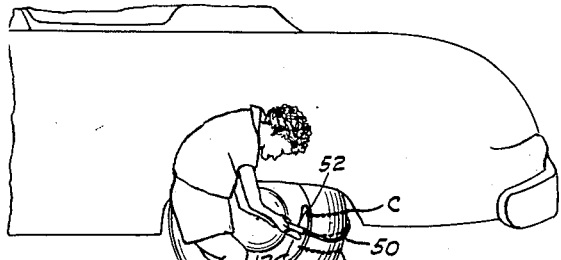
Fig. 1.
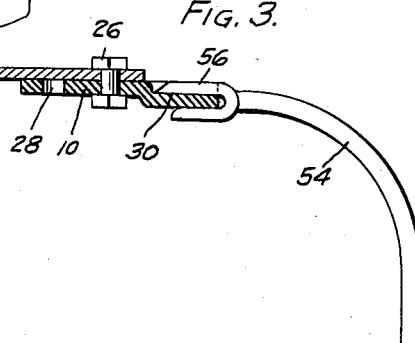
Fig. 3.
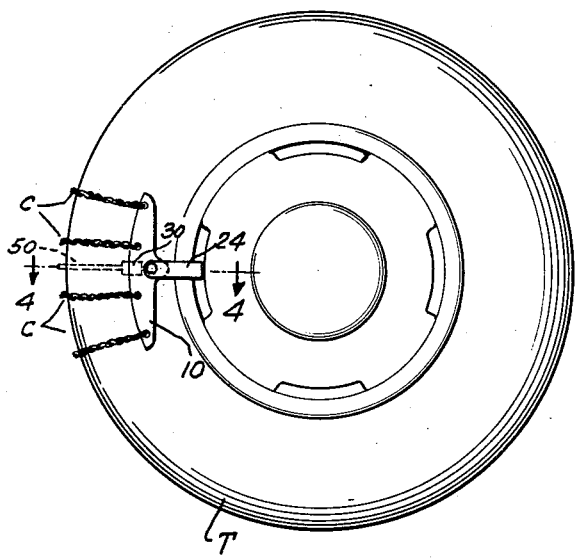
Fig. 2.
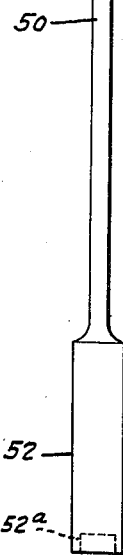
Fig. 3-A.
INVENTOR.
JOHN PAGEL
BY
Harry H. Hitzeman
ATTORNEY.

Oct. 8, 1957  J. PAGEL  2,808,869
TRACTION CLEAT
Filed March 16, 1955  2 Sheets-Sheet 2
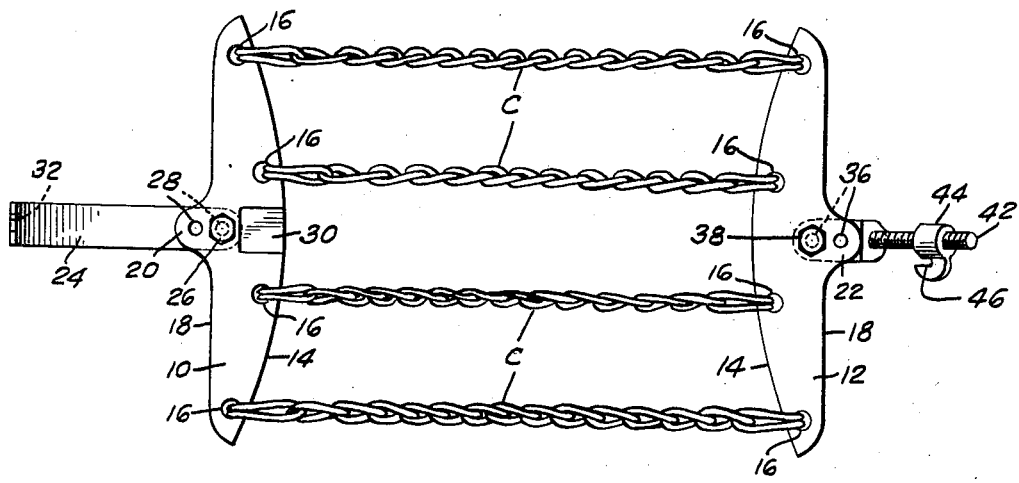
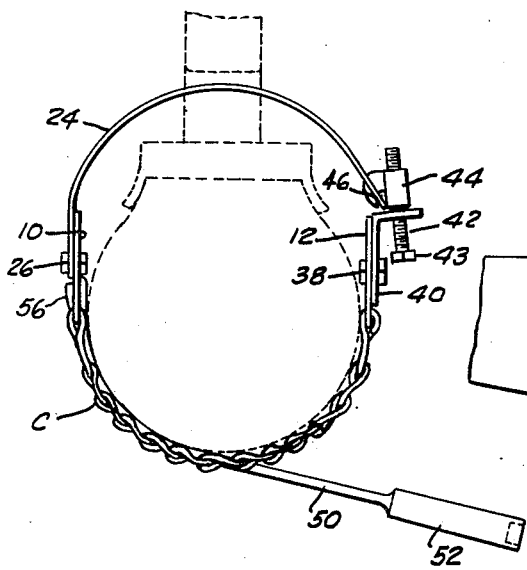
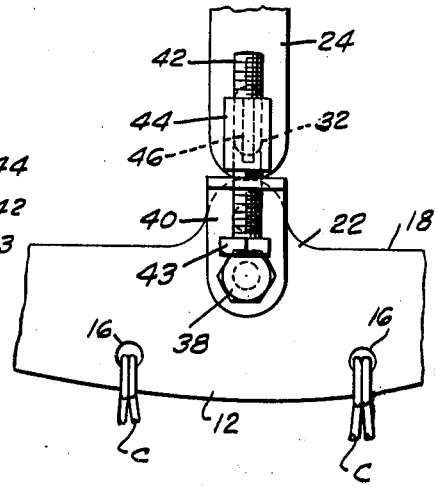
INVENTOR.
JOHN PAGEL
BY
Harry N. Hitzeman
ATTORNEY

United States Patent Office 2,808,869
Patented Oct. 8, 1957

2,808,869

TRACTION CLEAT

John Pagel, Chicago, Ill.

Application March 16, 1955, Serial No. 494,720

2 Claims. (Cl. 152—237)

My invention relates to improvements in traction cleats for automobiles.

My invention relates more particularly to an easily and quickly applied traction cleat which is so constructed that it is manipulated in attaching to a wheel by a novel applying tool which accompanies the same.

Traction cleats or chains are usually difficult if not impossible to apply to a wheel that is stuck in the mud. In addition, the person attaching the same usually gets his hands and clothes dirtied and soiled. A feature of the present invention is the construction of a traction cleat having a plurality of chains connected to side plates, one of said plates having an arcuate arm which passes through the wheel on the inside of the tire and is connected to an adjustable hook carried by the other side plate.

A further feature of the invention is the provision of a handle member which has a pair of jaws that embrace the edge of the side plate for moving the arcuate arm through the wheel without requiring any manual handling of the device by the person attaching the same.

Other features of the invention reside in the adjustability of the unit for various size tires, the arrangement and connection of the traction chains to the side plates and the attachment of the arcuate arm and hook bolt brackets to the side plates as will be more apparent from the following description wherein reference is had to the accompanying drawings, upon which:

Fig. 1 is a fragmentary side elevational view of an automobile showing a small child applying the traction cleat of my invention;

Fig. 2 is a side elevational view of an automobile wheel with one of the traction cleats applied to the same;

Fig. 3 is a detailed view showing the applying tool and the manner in which it is connected to one of the side plates for attachment of the cleat;

Fig. 3-A is an end view of the applying tool;

Fig. 4 is a cross-sectional view taken generally on the line 4—4 of Fig. 2, showing the manner in which the tire cleat is applied to the tire and wheel and before the same has been fastened on the tire;

Fig. 5 is a plan view of the tire cleat in an opened position; and

Fig. 6 is a fragmentary side elevational view from the right of Fig. 4.

In the embodiment of the invention which I have chosen to illustrate and describe the same, and referring more particularly to Fig. 5, the traction cleat may include a pair of arcuately shaped side plates 10 and 12, each of which has a curved edge 14 with a plurality of openings 16 positioned along the edge 14 of the plate. Both the plates 10 and 12 may have a comparatively straight back edge 18 terminating in a medially disposed ear 20 on the plate 10 and the ear 22 on the plate 12. The side plates 10 and 12 are connected between the aligned openings 16 by any suitable or desirable chains or cleat links C which are adapted to fit around the exterior periphery of the tire, as will be presently apparent.

The side plate 10, as best shown in Figs. 4 and 5, has an arcuate arm 24 connected thereto by a bolt member 26 which is fastened through one of a pair of aligned openings 28 in the ear 20 so that the arcuate arm can be adjusted to embrace a smaller or larger wheel depending upon the application of the traction cleat. The plate 10 is also formed with a flattened ledge 30. The ledge 30 has parallel side shoulders which form a guide for the attaching tool, as will be later explained. The end of the arcuate arm 24 is formed with an elongated opening 32.

The side plate 12 may have a pair of bolt openings 36 to receive a bolt 38 which fastens an L-shaped bracket 40 to the side of the ear 22. The L-shaped bracket 40 carries a screw-threaded bolt 42 adjustably mounted therein, the bolt 42 being provided with a head 43 for rotation of the same and adapted to carry a hook member 44 screw-threadedly mounted thereon. The hook member 44 is provided with the jaw portion 46 which in action engaged through the elongated opening 32 in the end of the arcuate arm 24.

As previously pointed out, in order to apply the traction cleat which has been hereinbefore described, it has been especially designed so that by the use of a simple applying tool which is furnished with the same the traction cleat can be attached to a wheel in a matter of seconds by anyone, even a small child. The applying tool, as best shown in Figs. 1, 3 and 4, may comprise an arm 50 which is provided at one end with a handle portion 52 and has a generally arcuate strap portion 54 at the other end which terminates in a U-shaped jaw 56. The handle 52 has a square opening 52a in the end of the same adapted to fit over the bolt head 43 so that this end of the applying tool may be used for tightening the traction cleat on a tire.

The jaw portion 56 of the applying tool 50 is adapted to engage the ledge 30 of the cleat 10 between its side shoulder so that the entire traction cleat may be handled with the applying tool 50. As thus shown in Figs. 1 and 4, by manipulating the traction cleat wtih the handle 52, the side plate 10 is pushed around to the back of the tire T and the arcuate arm 24 is pushed around the rim of the automobile wheel to the opposite side of the tire. This presents the end of the arcuate arm which carries the slot 32 and the hook member 44 is now latched through the elongated opening 32 and by turning the bolt head 43 the traction cleat is rigidly fastened to the tire and wheel. The applying tool 50 is of course removed from the side plate 10 as soon as the hook 44 has been applied to the arcuate arm 24.

From the above and foregoing description it can be seen that by the use of the tool which I have provided the side plate of the tire cleat can be pushed back of the tire and the arcuate arm pushed around through the wheel for attachment to the hook on the other side plate. Thus the entire traction cleat is handled by one hand with an applying tool, and the hands and clothes will not become soiled. After the arcuate arm has been latched on the hook 44, the applying tool is removed from the plate 10, turned around, and the handle 52 is used as a wrench to rigidly tighten the bolt 42 and fasten the traction cleat around the tire.

With the adjustment of the bolt 42 and the provision of the two sets of openings 28 and 36 in the side plates 10 and 12, it can be seen that a traction cleat of a standard size is readily adaptable to various size tires, thus making the traction cleat one of almost universal application.

I contemplate that changes and modifications may be made in the exact details shown and I do not wish to be limited in any particular; rather what I desire to secure and protect by Letters Patent of the United States is:

1. A traction cleat for application to an automobile tire which comprises a pair of elongated side plates, each side plate having an arcuate edge concentric to the circumference of a tire, a plurality of chain members connected between the arcuate edges of said plates, one of said side plates having a transversely directed arcuate arm fastened thereto medially thereof, said arcuate arm adapted to pass around the inside of the tire to which the cleat is applied with the chains passing about the tread of the tire and said side plates lying against the sides of the tire, said arcuate arm having an opening at its end, an angle-shaped bracket fastened to the other of said side plates, a bolt carried by said bracket and a hook member screw-threadedly mounted on said bolt, said hook member adapted to engage the opening in the end of said arcuate arm to fasten said traction cleat on said tire.

2. A traction cleat for application to an automobile tire which comprises a pair of elongated side plates, each side plate having an arcuate edge concentric to the circumference of a tire, a plurality of chain members connected between the arcuate edges of said plates, one of said side plates having a transversely directed arcuate arm fastened thereto medially thereof, said arcuate arm adapted to pass around the inside of the tire to which the cleat is applied with the chains passing about the tread of the tire and said side plates lying against the sides of the tire, said arcuate arm having an opening at its end, an angle-shaped bracket fastened to the other of said side plates, a bolt carried by said bracket and a hook member screw-threadedly mounted on said bolt, said hook member adapted to engage the opening in the end of said arcuate arm to fasten said traction cleat on said tire, said first named plate formed with a ledge in its arcuate edge having side shoulders adapted to receive the U-shaped jaw of an applying tool.

References Cited in the file of this patent

UNITED STATES PATENTS

| | | |
|---|---|---|
| 2,461,737 | Huffman | Feb. 15, 1949 |
| 2,746,509 | Lang | May 22, 1956 |

FOREIGN PATENTS

| | | |
|---|---|---|
| 546,364 | Great Britain | July 9, 1942 |